(12) United States Patent
Savio et al.

(10) Patent No.: US 10,592,223 B2
(45) Date of Patent: Mar. 17, 2020

(54) USING A SINGLE DEPLOYER AGENT TO DEPLOY A PLURALITY OF PROGRAMS ON A SERVER

(71) Applicant: Hewlett Packard Enterprise Development LP, Houston, TX (US)

(72) Inventors: Alex Dominic Savio, Bangalore (IN); Shameembanu Dastagirsaheb Mulla, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 190 days.

(21) Appl. No.: 15/303,547

(22) PCT Filed: Jul. 10, 2014

(86) PCT No.: PCT/US2014/046175
§ 371 (c)(1),
(2) Date: Oct. 12, 2016

(87) PCT Pub. No.: WO2015/167592
PCT Pub. Date: Nov. 5, 2015

(65) Prior Publication Data
US 2017/0031670 A1 Feb. 2, 2017

(30) Foreign Application Priority Data
Apr. 30, 2014 (IN) .......................... 2195/CHE/2014

(51) Int. Cl.
*G06F 8/61* (2018.01)
*G06F 21/44* (2013.01)
(Continued)

(52) U.S. Cl.
CPC ................ *G06F 8/61* (2013.01); *G06F 21/44* (2013.01); *H04L 63/12* (2013.01); *H04L 67/34* (2013.01)

(58) Field of Classification Search
CPC ......... G06F 8/60–61; G06F 21/44–445; G06F 11/30–3096; G06F 11/34–3428
See application file for complete search history.

(56) References Cited

U.S. PATENT DOCUMENTS 6,393,483 B1 * 5/2002 Latif ................... H04L 41/0668 370/230
6,971,094 B1 * 11/2005 Ly ............................ G06F 8/65 717/172

(Continued)

FOREIGN PATENT DOCUMENTS

WO WO-2013165369 11/2013

OTHER PUBLICATIONS

Borgenholt et al., Audition: A DevOps-oriented service optimization and testing framework for cloud environments, published by NIK-2014 conference, 2013, pp. 1-12.*

(Continued)

*Primary Examiner* — S. Sough
*Assistant Examiner* — Zheng Wei

(57) ABSTRACT

Some examples described herein relate to deployment of a plurality of programs on a server in a cloud network. An example method may include using a single deployer agent on a server to deploy the plurality of programs on the server, wherein the plurality of programs are deployed from different sources via same port on the server.

20 Claims, 3 Drawing Sheets

(51) Int. Cl.
*H04L 29/06* (2006.01)
*H04L 29/08* (2006.01)

(56) References Cited

U.S. PATENT DOCUMENTS

| | | | | |
|---|---|---|---|---|
| 7,703,091 | B1* | 4/2010 | Martin | G06F 8/61 |
| | | | | 717/172 |
| 7,827,535 | B2 | 11/2010 | Maron | |
| 7,930,371 | B2 | 4/2011 | Furuyama et al. | |
| 8,190,715 | B1* | 5/2012 | Narayanaswamy | G06F 8/61 |
| | | | | 709/220 |
| 8,214,653 | B1* | 7/2012 | Marr | G06F 21/572 |
| | | | | 713/189 |
| 8,646,070 | B1* | 2/2014 | Patsenker | G06F 8/61 |
| | | | | 726/22 |
| 8,844,015 | B2* | 9/2014 | Pendergrass | G06F 21/33 |
| | | | | 726/10 |
| 8,887,144 | B1* | 11/2014 | Marr | G06F 8/65 |
| | | | | 717/168 |
| 9,064,126 | B2* | 6/2015 | Pruss | G06F 21/62 |
| 9,262,145 | B2* | 2/2016 | Grimme | G06F 8/60 |
| 9,720,668 | B2* | 8/2017 | McGrath | G06F 8/60 |
| 9,819,682 | B2* | 11/2017 | Dabbiere | H04L 63/10 |
| 2003/0033517 | A1* | 2/2003 | Rutherglen | H04L 63/0281 |
| | | | | 713/153 |
| 2003/0225851 | A1* | 12/2003 | Fanshier | G06F 8/61 |
| | | | | 709/208 |
| 2004/0268344 | A1* | 12/2004 | Obilisetty | G06F 8/60 |
| | | | | 717/175 |
| 2005/0044531 | A1 | 2/2005 | Chawla et al. | |
| 2005/0086284 | A1* | 4/2005 | Sano | H04N 7/17318 |
| | | | | 709/200 |
| 2005/0210528 | A1* | 9/2005 | Sano | H04N 5/44543 |
| | | | | 725/115 |
| 2005/0245249 | A1* | 11/2005 | Wierman | G06F 8/61 |
| | | | | 455/419 |
| 2006/0179116 | A1 | 8/2006 | Speeter et al. | |
| 2006/0225064 | A1* | 10/2006 | Lee | G06F 9/465 |
| | | | | 717/168 |
| 2006/0225070 | A1* | 10/2006 | Childress | G06F 8/60 |
| | | | | 717/174 |
| 2007/0283346 | A1* | 12/2007 | Delgrosso | G06F 8/60 |
| | | | | 717/176 |
| 2008/0141240 | A1* | 6/2008 | Uthe | G06F 8/61 |
| | | | | 717/174 |
| 2008/0141244 | A1* | 6/2008 | Kelley | G06F 8/61 |
| | | | | 717/178 |
| 2008/0276301 | A1* | 11/2008 | Nataraj | G06F 8/60 |
| | | | | 726/3 |
| 2009/0094596 | A1* | 4/2009 | Kuiper | G06F 8/61 |
| | | | | 717/174 |
| 2010/0077393 | A1* | 3/2010 | Stelting | G06F 8/61 |
| | | | | 717/176 |
| 2010/0281456 | A1 | 11/2010 | Eizenman et al. | |
| 2011/0126192 | A1* | 5/2011 | Frost | G06F 8/61 |
| | | | | 717/178 |
| 2012/0233677 | A1* | 9/2012 | Kowalewski | H04L 9/3247 |
| | | | | 726/7 |
| 2013/0152047 | A1 | 6/2013 | Moorthi et al. | |
| 2013/0221944 | A1* | 8/2013 | Cheng | H02M 3/157 |
| | | | | 323/318 |
| 2013/0232481 | A1* | 9/2013 | Yamashita | G06F 9/445 |
| | | | | 717/177 |
| 2013/0275960 | A1* | 10/2013 | Kirchev | G06F 8/61 |
| | | | | 717/175 |
| 2013/0276089 | A1* | 10/2013 | Tseitlin | H04L 63/101 |
| | | | | 726/10 |
| 2014/0075032 | A1 | 3/2014 | Vasudevan et al. | |
| 2014/0096136 | A1* | 4/2014 | Duan | G06F 9/455 |
| | | | | 718/1 |
| 2014/0282495 | A1* | 9/2014 | Chico de Guzman Huerta | G06F 8/61 |
| | | | | 717/177 |
| 2015/0121485 | A1* | 4/2015 | Collins | H04L 41/0803 |
| | | | | 726/5 |
| 2015/0227357 | A1* | 8/2015 | Zamir | G06F 8/65 |
| | | | | 717/173 |
| 2016/0062754 | A1* | 3/2016 | Tripp | G06F 8/60 |
| | | | | 717/120 |
| 2016/0099972 | A1* | 4/2016 | Qureshi | H04L 63/20 |
| | | | | 726/1 |

OTHER PUBLICATIONS

Korean Intellectual Property Office, International Search Report and Written Opinion, dated Dec. 30, 2014, 10 pages.
Total Performance Visibility, "Universal Monitoring Agent: Monitoring Anything IT", eG Innovations, May 1, 2014, 3 pages.
Unknown, "Into ALM with TFS", Blogging About Application Lifecycle Management With Team Foundation Server, Jan. 23, 2014, 20 pages.

* cited by examiner

FIG. 1    100

USING A SINGLE DEPLOYER AGENT TO DEPLOY A PLURALITY OF PROGRAMS ON A SERVER

BACKGROUND

Cloud computing has fundamentally changed the way IT services are delivered to enterprises. Generally speaking, cloud computing involves delivery of computing as a service rather than a product, whereby shared resources (software, storage resources, etc.) are provided to computing devices as a service. The resources are shared over a network such as the internet. Cloud computing thus provides a quick and scalable access to computing resources and information technology (IT) services.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Cloud computing is a delivery model for technology-enabled services that provides on-demand and pay-as-you-use access to an elastic pool of shared computing resources. Some examples of such resources may include applications, servers, storage, networks, etc. Cloud computing allows rapid provisioning of computing resources that could be scaled up or down depending on the requirements of a customer. Thus, these assets may be consumed "as a service."

There are many models of cloud computing such as Infrastructure-as-a-Service (IaaS), Platform-as-a-Service (PaaS) and Software-as-a-Service (SaaS). Depending on a client's requirement, a cloud service provider may provide either of the aforementioned services each of which may require provisioning of certain resources on a cloud. For instance, in case of a client request for deployment of an application (for example, an email application) on a cloud, a cloud service provider may provision infrastructure resources (for example, a virtual server) and platform resources in order to deploy the application. Additionally, in some cases, a cloud service provider may also need to deploy a monitoring tool to ensure proper functioning of the application in compliance with a client's policies, for instance, as specified in a Service Level Agreement. Typically, the aforesaid activities i.e. provisioning of infrastructure, platform installation and application deployment may require different types of deployer programs (machine readable instructions) to deploy the platform software or application on a target machine (for example, a virtual server). In turn, each of these deployers may install an agent on the target machine to perform the deployment operation. Likewise, a monitoring tool may also install an agent on a client machine to collect performance metrics. Installation and configuration of multiple agents may require opening of multiple ports and allocation of additional memory on a target machine. Needless to say either of these activities is not desirable since they are time consuming and prone to risk.

The present disclosure describes deployment of a plurality programs on a server in a cloud network using a single deployer agent. The single deployer agent, which is installed on the server, deploys each of the plurality of programs from a different source via same port on the server. In an example, the present disclosure describes using a single agent to perform platform software deployment, application deployment and monitoring on a target machine via a common port.

Figure 1:
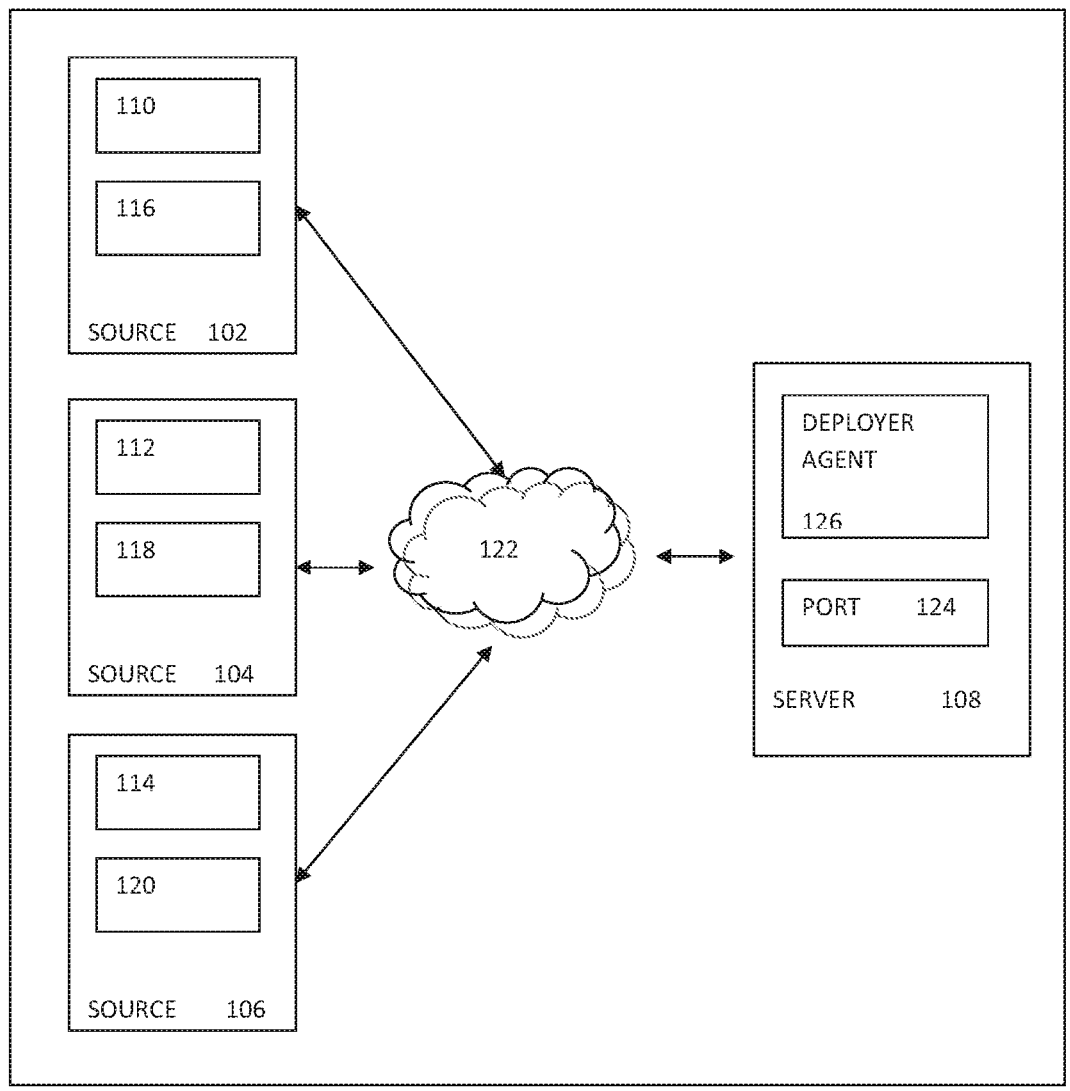
FIG. 1 is a block diagram of an example computing environment that facilitates deployment of a plurality of programs on a server in a cloud network.

FIG. 1 is a block diagram of an example computing environment 100 that facilitates deployment of a plurality of programs on a server in a cloud network. Computing environment 100 may include program sources 102, 104, and 106, and a server 108. In an example, computing environment 100 may be a cloud network or cloud system ("cloud") that may be a private cloud, a public cloud, or a hybrid cloud. To explain briefly, a cloud system may be termed as public cloud if cloud computing services are rendered over a public network such as the internet. On the other hand, a private cloud is a proprietary network that supplies services to a specific set of users. A hybrid cloud combines private and public cloud services. Further, a cloud system may provide or deploy various types of cloud services for a user or customer. These may include Infrastructure as a Service (IaaS), Platform as a Service (PaaS), Software as a Service (SaaS), and so forth. In order to provide an aforementioned service, a cloud may include various types of computing resources. These computing resources may be hardware resources, software resources, or any combinations thereof. For example, hardware resources may include computer systems, computer servers, workstations, or any other computer devices. And, software resources may include operating system software (machine executable instructions), firmware, and/or application software. Computing resources may also include virtual machines, virtual servers, storage resources, load balancers, firewalls, etc. In another example, computing environment may be a client-server network. The number of program sources 102, 104, and 106, and server 108 shown in FIG. 1 is for the purpose of illustration only and their number may vary in other implementations.

Program sources 102, 104, and 106, may each be a computing device such as a server, a desktop computer, a notebook computer, a tablet computer, a mobile phone, personal digital assistant (FDA), a virtual server, and the like. Additionally, program sources 102, 104, and 106, may each be a storage system such as a Direct Attached Storage (DAS) device, a Network Attached Storage (NAS) device, a server, a tape storage device, a floppy disk, a hard disk, a CD-ROM, a DVD, a pen drive, or any other storage device.

Each of the program sources 102, 104, and 106 may store at least one computer program or application. As illustrated in FIG. 1, program sources 102, 104, and 106 may include computer programs 110, 112, and 114 respectively. In an example, each of the computer programs 110, 122, and 114 may perform a specific task. Some non-limiting examples of tasks or functions performed by computer programs 110, 112, and 114 may include provisioning of infrastructure, platform installation, application deployment and monitoring of services and/or computing resources in computing environment 100. In an instance, computer programs 110, 112, and 114 may be used for providing a cloud service such as Infrastructure as a Service (IaaS), Platform as a Service (PaaS), Software as a Service (SaaS), and the like. Computer programs 110, 112, and 114 may be, for instance, a system program, an application program, a firmware, and the like.

Each of the program sources 102, 104, and 106 may include a deployer module for each of the computer program or application stored thereon. As illustrated in FIG. 1, program sources 102, 104, and 106 may include deployer modules 116, 118, and 120 for computer programs 110, 112, and 114 respectively. A deployer module (for example, 116) may be used to deploy a computer program (example, 102) on a target system (example, 108). In an example, each of the deployer modules 116, 118, and 120 may install an associated computer program (110, 112, and 114 respectively) on server 108. The term "module" may refer to a software component (machine executable instructions), a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computing device.

Program sources 102, 104, and 106, may communicate with server 108 over a computer network 122. Computer network 122 may be a wireless or wired network. Computer network 122 may include, for example, a Local Area Network (LAN), a Wireless Local Area Network (WAN), a Metropolitan Area Network (MAN), a Storage Area Network (SAN), a Campus Area Network (CAN), or the like. Further, computer network 122 may be a public network (for example, the Internet) or a private network (for example, an intranet). In an example, a program source (such as 102) may communicate with server 108 over network 108 to install a computer program (such as 110) stored thereon.

Server 108 may be a physical server or virtual server. In an example, server 108 may be a system (in a cloud network) that may be provisioned by a cloud service provider for a customer or client. Server 108 may include a communication port 124, which may be a physical port or virtual port. Server 108 may include a deployer agent (machine readable instructions) 126. As used herein, a "deployer agent" may be a module or service that aids in the deployment of a program on a computing device. Deployer agent 126 may be preinstalled on server 108 or it may be installed by a deployer module (for example, 116, 118, or 120). In an example, deployer agent 126 may be installed on server 108 by a DevOps tool, which may be present on any of the program sources 102, 104, or 106, or another computer system (not shown). In an instance, the deployer agent 126 may provide a common framework program (machine readable instructions) that may be used by a plurality of deployer modules to deploy their respective associated programs on a server (example, 108). A user may also use said common framework program of the deployer agent 126 to install a specific program product on a server (example, 108).

The deployer agent 126 may be used by a deployer module (example, 116, 118, and 120), for instance, for deployment, command execution, and monitoring of a computer program on a target machine (for example, 108). In an example, a deployer module (example, 116) may install an associated computer program (example, 110) from its source location on to a target machine (example, 108) using the deployer agent installed on the target machine. In an instance, a plurality of deployer modules (example, 116, 118, and 120) may install their respective associated computer programs (example, 110, 112, and 114) from their source locations (102, 104, and 106) on to a target machine (example, 108) using a single deployer agent (example, 126) and a common port (example, 124). Said differently, a deployer agent (example, 126) may deploy a plurality of programs (example, 110, 112, and 114) on a target machine (for example, server 108) from separate program sources (example, 102, 104, and 106) via same port (example, 124) on the server 108. In other words, each of the deployer modules (116, 118, and 120) may install an associated computer program (110, 122, and 114 respectively) on server 108. In an instance, prior to aforementioned installation, the deployer agent 126 may exchange a security certificate with each of the deployer modules that that may install its associated computer program on a target machine to ensure safe communication. Additionally, a secure protocol such as Hypertext Transfer Protocol Secure (HTTPS) may be used to ensure a secure communication between deployer modules (116, 118, and 120) and the deployer agent 126.

In an example, the deployer agent 126 may monitor the plurality of programs installed on a target machine (example, 108) (via same communication port), for instance, to measure various performance parameters. Some non-limiting examples of such parameters may include the utilization rates of CPU cores, memory, boot disks, downtime, latency rate, availability, service time, and response time. In addition, the deployer agent 126 may monitor the plurality of programs installed on a target machine to ensure compliance with a client's policies, for instance, those specified in a Service Level Agreement or a monitoring policy. A monitoring policy may define various performance characteristics that may be monitored in respect of a resource (for example, a deployed application). In an example, a monitoring policy may be deployed during deployment of the plurality of programs (from different sources) on to a target machine. Thus, in some instances, a deployer agent may gather information about an installed program.

In another example, a monitoring agent installed on a target machine (example, server 108) may function as the deployer agent 126. In such case, the monitoring agent may deploy a plurality of programs (example, 110, 112, and 114) on a target machine (for example, server 108) from separate program sources (example, 102, 104, and 106) via same port (example, 124) on a server (example, 108).

Figure 2:
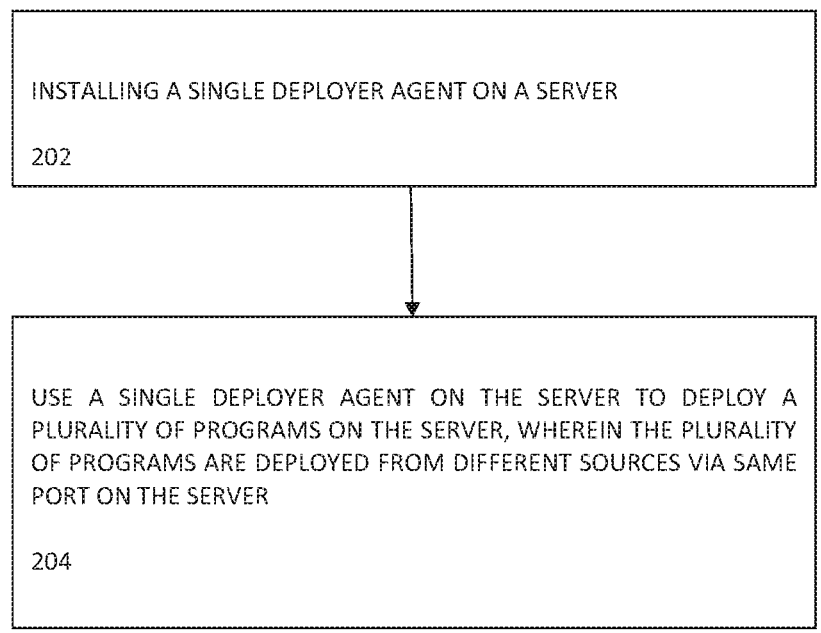
FIG. 2 is a flow chart of an example method for deploying a plurality of programs on a server in a cloud network.

FIG. 2 is a flow chart of an example method 200 for deploying a plurality of programs on a server in a cloud network. The method 200, which is described below, may be executed on a computing device such as server 108 of FIG. 1. However, other computing devices may be used as well. At block 202, a deployer agent (example, 126) may be installed on a target machine (i.e. a computer system selected for installation of a plurality of programs; example, 108). In an example, a deployer agent (example, 126) may be installed on a target machine by a deployer module (example, 116, 118, and 120). In an example, a deployer agent (example, 126) may be installed on a target machine by a DevOps tool. At block 204, a single deployer agent installed on a server in a cloud network may be used to deploy a plurality of programs on the server. In an instance, the plurality of programs may be deployed from different sources (example, separate servers) via same communication port on the server. To provide an example illustration with reference to FIG. 1, a deployer agent (example, 126) may deploy a plurality of programs (example, 110, 112, and 114) on a target machine (for example, server 108) from separate program sources (example, 102, 104, and 106) via same port (example, 124) on the target machine (for example, server 108). In an example, a single deployer agent (example, 126) installed on a target machine (example, 108) may be used by a plurality of deployer modules (example, 116, 118, and 120) to install their respective associated computer programs (example, 110, 112, and 114) from program source locations (102, 104, and 106) on to a target machine (example, 108) using a common port (example, 124) on the target machine.

In an example, the deployer agent (for example, 126) may monitor the plurality of programs installed on the target machine (via same communication port) to ensure, for instance, compliance with a monitoring policy.

In an example, the deployer agent (for example, 126) may exchange a security certificate with each of the plurality of programs prior to the deployment of the plurality of programs on a target machine (via same communication port) to ensure safe communication.

Figure 3:
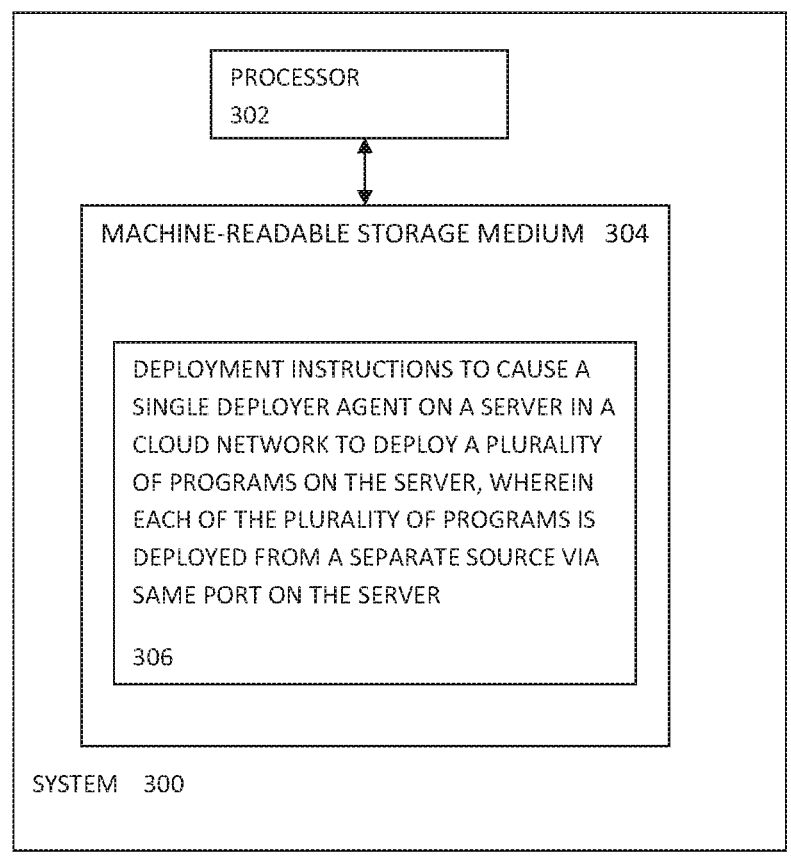
FIG. 3 is a block diagram of an example system that facilitates deployment of a plurality of programs on a server in a cloud network.

FIG. 3 is a block diagram of an example system 300 that facilitates deployment of a plurality of programs on a server in a cloud network. System 300 includes a processor 302 and a machine-readable storage medium 304 communicatively coupled through a system bus. In an example, system 300 may be analogous to server 108 of FIG. 1. Processor 302 may be any type of Central Processing Unit (CPU), microprocessor, or processing logic that interprets and executes machine-readable instructions stored in machine-readable storage medium 304. Machine-readable storage medium 304 may be a random access memory (RAM) or another type of dynamic storage device that may store information and machine-readable instructions that may be executed by processor 302. For example, machine-readable storage medium 304 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 304 may be a non-transitory machine-readable medium. In an example, machine-readable storage medium 304 may be remote but accessible to system 300.

Machine-readable storage medium 304 may store deployment instructions 306. In an example, deployment instructions 306 may be executed by processor 302 to cause a single deployer agent (example, 126) on a server (example, 108) in a cloud network to deploy a plurality of programs (example, 110, 112, and 114) on a server, wherein each of the plurality of programs (example, 110, 112, and 114) is deployed from a separate source (example, 102, 104, and 106) via same port (example, 124) on the server (example, 108). Machine-readable storage medium 304 may further store installation instructions executable by processor 302 to install a single deployer agent (example, 126) on a server (example, 108). Machine-readable storage medium 304 may further store instructions executable by processor 302 to monitor the plurality of programs deployed from different sources (example, 102, 104, and 106) via same port (example, 124) on a server (example, 108). In an example, the monitoring instructions are defined in a monitoring policy. Machine-readable storage medium 304 may further store instructions executable by processor 302 to deploy a monitoring policy during deployment of the plurality of programs (example, 110, 112, and 114) on a server (example, 108) from different sources (102, 104, and 106).

For the purpose of simplicity of explanation, the example method of FIG. 2 is shown as executing serially, however it is to be understood and appreciated that the present and other examples are not limited by the illustrated order. The example systems of FIGS. 1 and 3, and method of FIG. 2 may be implemented in the form of a computer program product including computer-executable instructions, such as program code, which may be run on any suitable computing device in conjunction with a suitable operating system (for example, Microsoft Windows, Linux, UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution.

The invention claimed is:

1. A method comprising:
exchanging security information, by a single monitoring agent on a server, with a plurality of source devices via a first communication port of a plurality of communication ports of the server, wherein each source device of the plurality of source devices comprises a unique application program of a plurality of application programs;
deploying on the server, by the single monitoring agent, the plurality of application programs from the plurality of source devices via the first communication port of the server, wherein deploying the plurality of application programs is performed without using any other agent installed on the server, wherein the single monitoring agent on the server is to interact with a plurality of deployer modules on the plurality of source devices during deployment of the plurality of application programs;
monitoring, by the single monitoring agent, the deployed plurality of application programs on the server via the first communication port of the server.

2. The method of claim 1, further comprising installing the single monitoring agent on the server.

3. The method of claim 2, wherein the single monitoring agent is installed using a DevOps tool.

4. The method of claim 1, wherein monitoring the plurality of application programs on the server comprises measuring, by the single monitoring agent, performance measures of the deployed plurality of application programs.

5. The method of claim 1, wherein exchanging the security information comprises the single monitoring agent exchanging, via the first communication port of the server, a security certificate with each of the plurality of application programs prior to the deployment of the plurality of application programs on the server.

6. The method of claim 1, wherein the server does not include any deployer agent specific to one of the plurality of application programs.

7. The method of claim 1, wherein each of the plurality of deployer modules is associated with a unique one of the plurality of application programs, and wherein none of the plurality of deployer modules is installed on the server.

8. A system, comprising:
a plurality of source servers, each storing a unique one of a plurality of application programs; and
a physical server connected to the plurality of source servers via a network, wherein the physical server includes a single monitoring agent and a plurality of communication ports, wherein the single monitoring agent is to:
exchange security information with the plurality of source servers via a first communication port of the physical server;
deploy, via the first communication port of the physical server, the plurality of application programs on the physical server without using any other agent installed on the physical server, wherein the plurality of application programs are deployed from the plurality of source servers, wherein the single monitoring agent on the physical server is to interact with a plurality of deployer modules on the plurality of source servers during deployment of the plurality of application programs; and
monitor the deployed plurality of application programs on the physical server via the first communication port of the physical server.

9. The system of claim 8, wherein no agent specific to one of the plurality of application programs is installed on the physical server.

10. The system of claim 8, wherein the single monitoring agent is to monitor performance measures of the deployed plurality of application programs via the first communication port of the physical server.

11. The system of claim 8, wherein the exchanged security information comprises a security certificate.

12. The system of claim 8, further comprising a deployer module to deploy the single monitoring agent on the physical server.

13. The system of claim 8, wherein each of the plurality of deployer modules is associated with a unique one of the plurality of application programs, and wherein none of the plurality of deployer modules is installed on the physical server.

14. A non-transitory machine-readable storage medium comprising instructions executable by a processor to:
exchange, by a single monitoring agent on a server, security information with a plurality of source devices via a first communication port of the server, wherein each source device of the plurality of source devices comprises a unique program of a plurality of application programs;
deploy, by the single monitoring agent, the plurality of application programs on the server, wherein each of the plurality of application programs is deployed via the first communication port without using any other agent installed on the server, wherein the single monitoring agent on the server is to interact with a plurality of deployer modules on the plurality of source devices during deployment of the plurality of application programs; and
monitor, by the single monitoring agent, the deployed plurality of application programs on the server via the first communication port of the server.

15. The storage medium of claim 14, the instructions further executable to install the single monitoring agent on the server.

16. The storage medium of claim 14, the instructions further executable to measure, by the single monitoring agent, performance measures of the plurality of deployed application programs on the server.

17. The storage medium of claim 16, wherein the performance measures are defined in a monitoring policy that is deployed during deployment of the plurality of application programs on the server.

18. The storage medium of claim 14, wherein the exchanged security information comprises a security certificate.

19. The storage medium of claim 14, wherein the server does not include any deployer agent specific to one of the plurality of application programs.

20. The storage medium of claim 14, wherein each of the plurality of deployer modules is associated with a unique one of the plurality of application programs, and wherein none of the plurality of deployer modules is installed on the server.

* * * * *